US010223360B2

(12) United States Patent
Jungbauer, Jr. et al.

(10) Patent No.: US 10,223,360 B2
(45) Date of Patent: Mar. 5, 2019

(54) PRINT JOB ARCHIVES THAT ARE OPTIMIZED FOR SERVER HARDWARE

(71) Applicants: James Douglas Jungbauer, Jr., Boulder, CO (US); Michael Glen Lotz, Longmont, CO (US); Marquis G. Waller, Beverly, OH (US)

(72) Inventors: James Douglas Jungbauer, Jr., Boulder, CO (US); Michael Glen Lotz, Longmont, CO (US); Marquis G. Waller, Beverly, OH (US)

(73) Assignee: RICOH COMPANY, LTD., Tokyo (JP)

( * ) Notice: Subject to any disclaimer, the term of this patent is extended or adjusted under 35 U.S.C. 154(b) by 978 days.

(21) Appl. No.: 14/557,658

(22) Filed: Dec. 2, 2014

(65) Prior Publication Data
US 2016/0154806 A1   Jun. 2, 2016

(51) Int. Cl.
*G06F 17/30* (2006.01)

(52) U.S. Cl.
CPC .............. *G06F 17/30073* (2013.01)

(58) Field of Classification Search
CPC ......... G06F 17/30619; G06F 17/30893; G06F 17/30383; G06F 17/30221
USPC ........................................................ 707/673
See application file for complete search history.

(56) References Cited

U.S. PATENT DOCUMENTS

| 5,599,945 | A | * | 2/1997 | Wroblowsky | ........ | C07C 281/04 |
| | | | | | | 548/263.6 |
| 6,173,295 | B1 | * | 1/2001 | Goertz | .................. | G06F 3/1205 |
| | | | | | | 715/209 |
| 6,263,121 | B1 | | 7/2001 | Melen et al. | | |
| 6,384,932 | B1 | * | 5/2002 | Fujisawa | ................ | B41B 27/00 |
| | | | | | | 358/1.18 |
| 6,587,217 | B1 | * | 7/2003 | Lahey | .................... | G06F 3/1205 |
| | | | | | | 358/1.15 |
| 6,980,987 | B2 | * | 12/2005 | Kaminer | ........... | G06F 17/30893 |
| | | | | | | 707/662 |
| 7,035,842 | B2 | | 4/2006 | Kauffman et al. | | |
| 7,580,149 | B2 | * | 8/2009 | Monga | .............. | G06F 17/30943 |
| | | | | | | 358/1.16 |
| 7,720,846 | B1 | | 5/2010 | Bayliss | | |
| 8,504,549 | B2 | | 8/2013 | Moe | | |
| 8,539,000 | B2 | | 9/2013 | Solmer | | |
| 2002/0078083 | A1 | * | 6/2002 | Armstrong | .............. | B42C 19/02 |
| | | | | | | 715/255 |

(Continued)

*Primary Examiner* — Jean M Corrielus
(74) *Attorney, Agent, or Firm* — Duft & Bornsen, PC (57) ABSTRACT

Systems and methods are provided for generating a print job archive optimized for searching by a specific server. The system includes a memory and an indexing controller. The indexing controller generates an archive for print jobs, by determining a number of Central Processing Unit (CPU) cores that access the archive, and generating table files in the archive equal to the number of CPU cores. The indexing controller also populates the archive by detecting print jobs, generating records that describe the print jobs, and distributing the records such that each table file includes a different set of records. Further, the indexing controller searches the archive by triggering multiple processing threads that each utilize a different CPU core to review a different table file of the archive based on the search request, and reporting a set of records in the archive that match the request.

20 Claims, 7 Drawing Sheets

(56) References Cited

U.S. PATENT DOCUMENTS

| | | | |
|---|---|---|---|
| 2005/0044183 A1* | 2/2005 | Meunier | G06Q 10/10 709/219 |
| 2008/0074698 A1* | 3/2008 | Richter | G06F 3/1204 358/1.15 |
| 2008/0162429 A1 | 7/2008 | Ram | |
| 2008/0168439 A1* | 7/2008 | Anderson | G06F 17/30221 718/1 |
| 2008/0263007 A1* | 10/2008 | Schmidt | G06F 17/30383 |
| 2010/0268690 A1* | 10/2010 | Anderson | G06F 17/30221 707/661 |
| 2012/0036167 A1 | 2/2012 | Herrnstadt | |
| 2013/0124582 A1 | 5/2013 | Yamamoto | |
| 2013/0166598 A1 | 6/2013 | Vaitheeswaran et al. | |
| 2013/0325873 A1* | 12/2013 | Sitsky | G06F 17/30619 707/741 |

* cited by examiner

JOB FILE

| | CUSTOMER NAME | ADDRESS | ZIP | START PAGE | END PAGE |
|---|---|---|---|---|---|
| RECORD → | JOHN COOPER | 15 PINE ST | 90654 | 01 | 06 |
| RECORD → | AMELIA BRAND | 907 WILLOW LN | 10356 | 07 | 18 |
| RECORD → | ARTHUR ROMILLY | 124 FIRST ST | 75267 | 19 | 19 |
| RECORD → | CHARLES MANN | 1524 WALL ST | 58128 | 20 | 57 |

410

TABLE FILE

| | CUSTOMER NAME | ADDRESS | ZIP | FILE |
|---|---|---|---|---|
| RECORD → | ELENA CASS | 1480 ELM RD | 36721 | FILE 1, RECORD 12 |
| RECORD → | KIP LANSFORD | 1260 YARD ST | 06891 | FILE 12, RECORD 58 |
| RECORD → | ARTHUR ROMILLY | 124 FIRST ST | 75267 | FILE 57, RECORD 1 |
| RECORD → | DARIUS LUNDGREN | 16 MANOR DRV | 26561 | FILE 3, RECORD 192 |

PRINT JOB ARCHIVES THAT ARE OPTIMIZED FOR SERVER HARDWARE

FIELD OF THE INVENTION

The invention relates to the field of computing, and in particular, to archiving and retrieving data on a computer system.

BACKGROUND

Print shops handle sophisticated and/or large volume print jobs for customers. A print shop typically includes a number of high-end printers (e.g., multifunction printers, continuous-forms production printers, etc.) that are capable of providing more functionality and/or print volume than a simple office printer. For example, a print shop may be used to print massive print jobs (e.g., having hundreds of thousands of pages) on a monthly basis in order to provide documents such as billing statements to large volumes of people.

A print shop is often managed by a print server that receives print jobs from client systems/devices (e.g., networked computers, mobile phones, etc.) and distributes those print jobs for printing. The print server tracks the progress of the print jobs as they are being queued, printed, and completed. For large jobs that include many individual documents, it may be important to record the properties of completed documents (e.g., when they were printed, who they were directed to, the address they were mailed to, etc.) in a searchable archive. The archive allows a print shop operator to confirm that individual documents were properly handled by the print shop. This information may be particularly important for print jobs that include financial information, as the law may require that these documents be printed and mailed to the correct recipient within a certain period of time.

Archiving the information for a large volume of documents (e.g., millions or tens of millions of documents) across numerous different print jobs remains problematic, because a print shop operator expects to be able to search the entire archive quickly and efficiently. Existing solutions using databases (e.g., Structured Query Language (SQL) databases) are hard for users to manipulate and parse, and also encounter implementation problems when attempting to share database information to remote users. Furthermore, databases are not easily moved from computer to computer.

SUMMARY

Embodiments described herein implement a file-based print job archive that is tuned to the hardware characteristics of a server that will be searching the archive. Specifically, the archive includes a searchable table that is split into multiple files, one per Central Processing Unit (CPU) core of the server. This provides a beneficial enhancement to multi-core optimization that is lacking in existing print job archives.

One embodiment is a system that manages a searchable archive of print jobs. The system includes a memory and an indexing controller. The indexing controller is able to generate an archive for tracking print jobs by determining a number of Central Processing Unit (CPU) cores at a server that accesses the archive, and by generating a number of table files in the archive equal to the number of CPU cores. The indexing controller is also able to populate the archive by detecting print jobs, by generating records that describe properties of the print jobs, and by distributing the records between the table files such that each table file includes a different set of records. Furthermore, the indexing controller is able to search the archive by receiving a search request by triggering multiple processing threads that each utilize a different CPU core of the server to review a different table file of the archive based on the search request, and by reporting a set of records in the archive that match the request.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
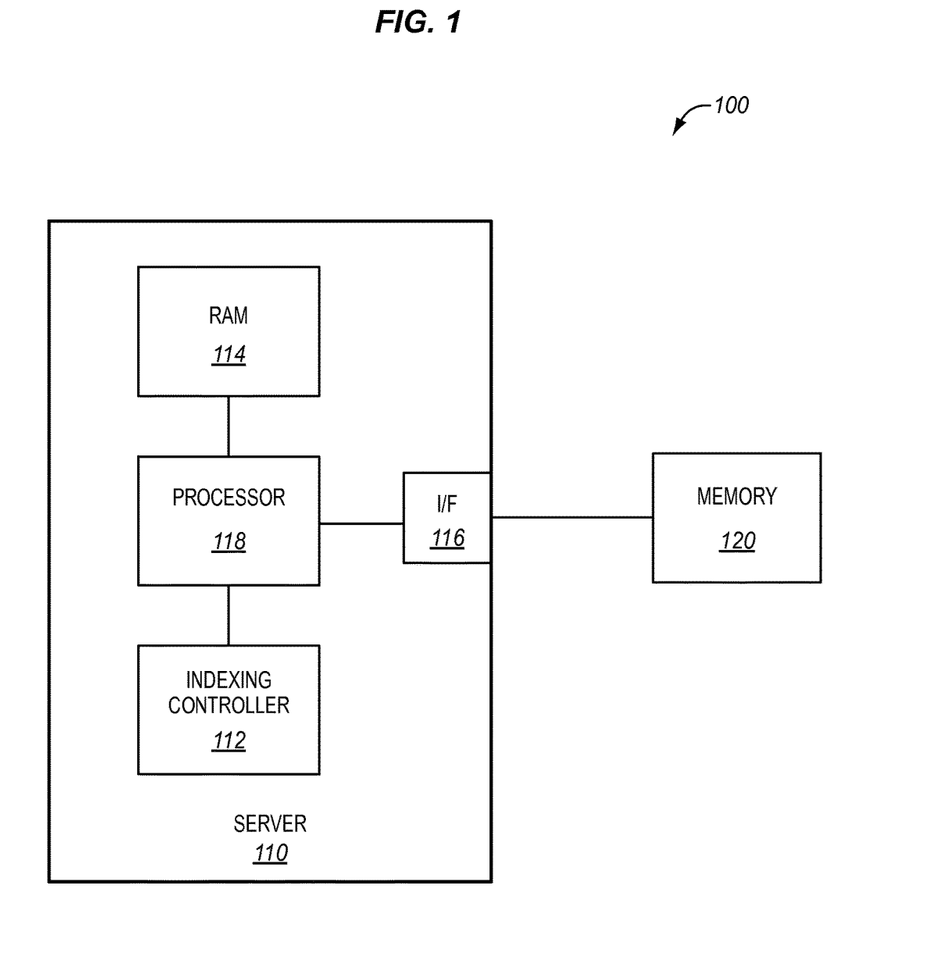
FIG. 1 is a block diagram of a print job archiving system for a print shop in an exemplary embodiment.

FIG. 1 is a block diagram of a print job archiving system 100 for a print shop in an exemplary embodiment. Archiving system 100 is capable of storing an archive of data describing print jobs (e.g., print jobs that have already been completed at the print shop). The archive includes a searchable table that describes each print job. This searchable table allows a print shop operator to quickly and accurately confirm whether or not a given print job (or document thereof) has been successfully processed by the print shop.

Archiving system 100 has been enhanced to increase the speed at which it analyzes the searchable table in the archive. Specifically, archiving system 100 is capable of dividing the searchable table into separate table files, based on the number of Central Processing Unit (CPU) cores that will be used to search the archive. When a search request is received, archiving system 100 performs its analysis of the table utilizing one processing thread (and one CPU core) per table file. Since each thread utilizes its own CPU core, and since each thread searches a separate file, the threads do not interfere with each other in their operations. Thus, the multithreaded nature of the search provides a substantial processing benefit.

In this embodiment, archiving system 100 includes a server 110 and a memory 120. Memory 120 stores the archive of print jobs. While memory 120 is depicted as a remotely accessible storage system, in other embodiments memory 120 may comprise a component of server 110. Server 110 (e.g., a print server) is capable of accessing and searching the archive in memory 120 to identify print jobs (and/or documents thereof) at the print shop. For example, server 110 may search the archive to find individual documents based on a customer name, an address, a ZIP code, etc.

In this embodiment, server 110 includes processor 118 and Random Access Memory (RAM) 114, which operate together in order to search the archive in memory 120. Search requests from server 110 are transmitted via interface (I/F) 116 (e.g., an Ethernet interface, a wireless interface, a bus, etc.). In embodiments where server 110 is a print server, processor 118 and RAM 114 may also be utilized to dynamically queue and manage print jobs sent to one or more printers in a print shop.

In this embodiment, server 110 also includes indexing controller 112. Indexing controller 112 is able to create and manage the archive stored in memory 120. Specifically, indexing controller 112 has been enhanced to revise the file structure of the archive stored in memory 120, based on the number of Central Processing Unit (CPU) cores in processor 118. This increases the overall speed of multithreaded searches performed on the archive. Indexing controller 112 may be implemented as custom circuitry, as a processor executing programmed instructions, etc. In one embodiment, indexing controller 112 is implemented on different hardware than server 110.

The particular arrangement, number, and configuration of components described herein is exemplary and non-limiting. Illustrative details of the operation of archiving system 100 will be discussed with regard to FIG. 2. Assume, for this embodiment, that an archive has not yet been created for print jobs, and that indexing controller 112 has just detected user input requesting that an archive be created (e.g., to track newly completed print jobs). The user input may include various parameters used to tune the archive, such as the number of documents expected to be tracked in the archive, the number of cores at processor 118, the size of RAM 114, an area within memory 120 at which to store the archive, etc.

Figure 2:
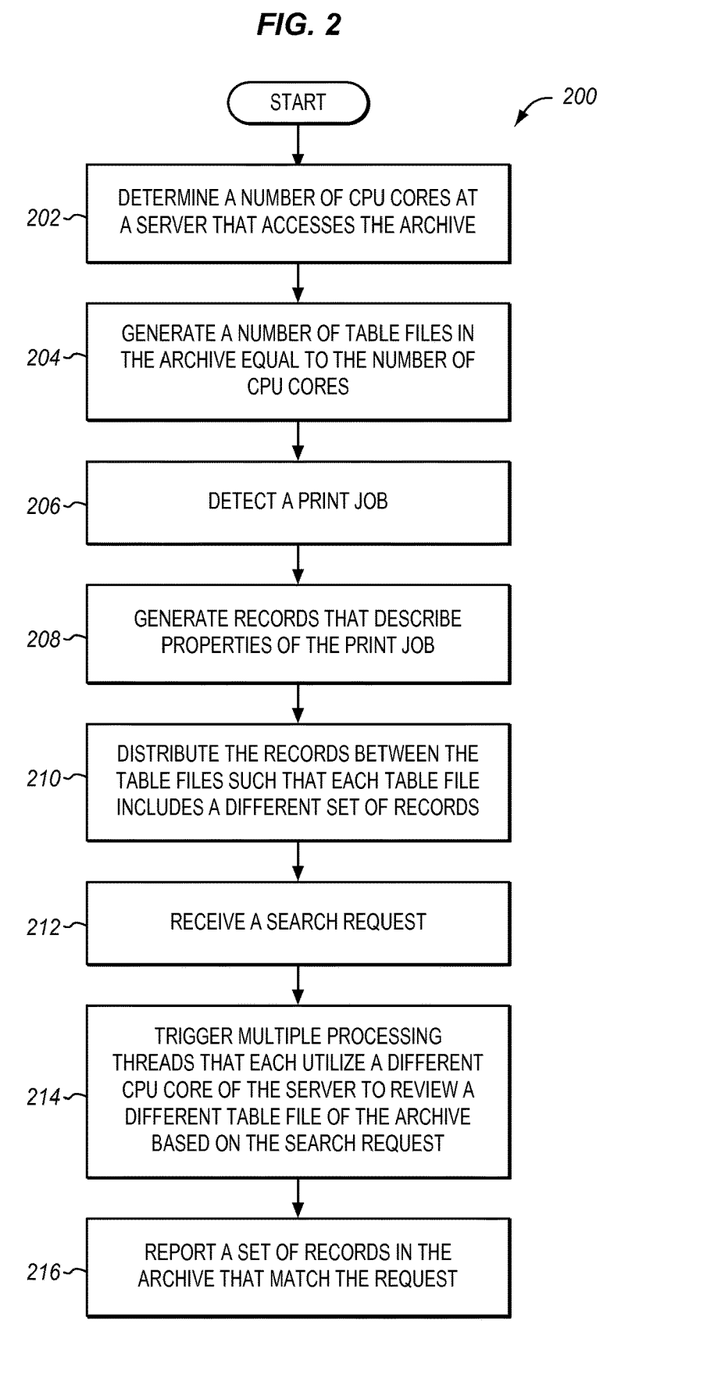
FIG. 2 is a flowchart illustrating a method for operating a print job archiving system in an exemplary embodiment.

FIG. 2 is a flowchart illustrating a method 200 for operating a print job archiving system in an exemplary embodiment. The steps of method 200 are described with reference to archiving system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, indexing controller 112 determines a number of CPU cores at server 110 that will be used to access the archive. This may be determined based on the user input described above, or may be determined by indexing controller 112 directly querying server 110. The number of CPU cores refers to the number of discrete hardware elements at server 110 that each operate as an independent CPU capable of reading and executing programmed instructions. For example, an individual dual-core processor may have two CPU cores. The number of CPU cores determined in step 202 is the number of CPU cores that will actually perform searches of the archive. Therefore, if server 110 includes multiple processors, and only a fraction of those processors is used for searching the archive, then indexing controller 112 counts only the number of CPU cores in that fraction.

The number of CPU cores in step 202 is the number of processing threads that should be used to search the archive. Thus, in step 204, indexing controller 112 creates a searchable table that is split into the same number of table files as the number of CPU cores. If the searchable table was made up of fewer table files than the number of threads, then the threads would compete with each other for access to the table files. Alternatively, if there were more table files than threads, each thread would lose efficiency as it jumped from file to file. Splitting/distributing the searchable content of the archive in this manner ensures that each CPU core may search a different table file as part of a multithreaded search without interference from other CPU cores.

Each table file is created to store records that describe print jobs (or individual documents within those print jobs). For example, a table file may comprise a delimited file (e.g., a comma separated value, tab delimited value, etc.) for storing the records. Each record may comprise a series of values for describing the print job or an internal document thereof. For example, each record may indicate the name of the customer to which a document was directed, an address of the customer, a ZIP code of the customer, a balance for a credit card or bank account of the customer, a date the document was printed, the printer that printed the document, etc. The table files may all be placed in the same file folder at memory 120, and this file folder may also be used to store other archive data for the print shop. At this point in time, the table files may be empty, waiting to be filled with records as print jobs are completed at the print shop.

In step 206, indexing controller 112 detects a print job at the print shop (e.g., a print job that has just been completed, a print job being tracked by a workflow system that has not yet initiated printing, etc.). For example, indexing controller 112 may detect a print job by receiving a confirmation from a printer. In one embodiment, each time a printer completes a print job, the printer (or a print server) adds a new "job file" to the file folder in which the archive is kept. The job file includes multiple records, one for each document in the print job. Indexing controller 112 may therefore detect a print job by detecting the presence of a new job file in the archive. In a further embodiment, indexing controller 112 may generate a job file for a new job based on input from a printer or print server.

After the print job has been detected, information describing the print job should be indexed and/or stored in the table files. Thus, in step 208, indexing controller 112 generates records that describe properties of the print job. These records will be placed into one or more table files for searching. Indexing controller 112 may create these records based on the existing records in a job file, or may create these records based on input from a printer or print server. In embodiments where indexing controller 112 generates new records based on the existing records in a job file, indexing controller 112 may extract and modify the individual records from the job file. For example, if record in a job file describes a document property such as "start page in print job" and "end page in print job," these properties are unlikely to be useful search parameters, and may therefore be excluded from the newly generated records. Indexing controller 112 may also add a pointer within each newly generated record, pointing to the job file and/or record that it refers to.

In step 210, indexing controller 112 distributes the newly generated records between the table files, such that each table file includes a different set of records. That is, each generated record may be assigned to one of the table files for storage in that table file. This may be performed in a number of different ways. For example, indexing controller 112 may assign new records to table files on a record by record basis, or on a print job by print job basis. Indexing controller 112 may use a round-robin approach to distribute records to the table files in sequence, may assign records to the table file that is currently the smallest, etc. When the records are distributed in this manner, each table file includes records for a different portion of the archive.

Steps 206-210 may be continuously performed as print jobs are handled by the print shop, in order to ensure that the table files of the archive are up to date. Eventually, a user will attempt to search the table files to identify print jobs (or documents thereof) that have already been completed. Thus, a user will generate a search request (e.g., via a remote client or directly via a user interface at server 110) and provide it to indexing controller 112.

In step 212, indexing controller 112 receives the search request from the user. The search request may list one or more properties to be searched (e.g., customer name, address, etc.), and may include partial or complete values for those properties (e.g., John *, "no more than 50 pages in size," "printed before Jan. 15, 2015," etc.).

In step 214, indexing controller 112 triggers multiple processing threads that each utilize a different CPU core of the server to review a different table file in the archive. Each processing thread searches a table file to find records that match the search request. Performing the search in this manner ensures that each CPU core will operate its own processing thread at maximum efficiency, because each thread will not be waiting on another thread when attempting to access a table file. Furthermore, since the number of processing threads does not exceed the number of CPU cores, CPU cores will not be forced to swap between processing threads, which would increase processing overhead and reduce the efficiency of the search. Still further, since the number of records in each table file is roughly the same, each thread will complete its search in roughly the same amount of time.

In step 216, indexing controller 112 reports the set of records in the table files that match the request. This information may include the contents of each matching record, presented in table form to the user. Having completed the search, indexing controller 112 continues populating the archive based on newly detected print jobs in steps 206-210 and handling search requests in steps 212-216. These operations may be performed substantially continuously and in parallel as new print jobs are detected and new search requests are generated.

Method 200 provides a distinct advantage over prior techniques, because it splits a searchable table for print jobs into multiple discrete files that may each be analyzed by a different thread/CPU of a server. Since the number of files is tuned to the number of CPU cores, the server achieves a substantial efficiency benefit when it performs a multi-threaded search upon the archive. This in turn ensures that results are provided to a user as quickly as possible.

Figure 3:
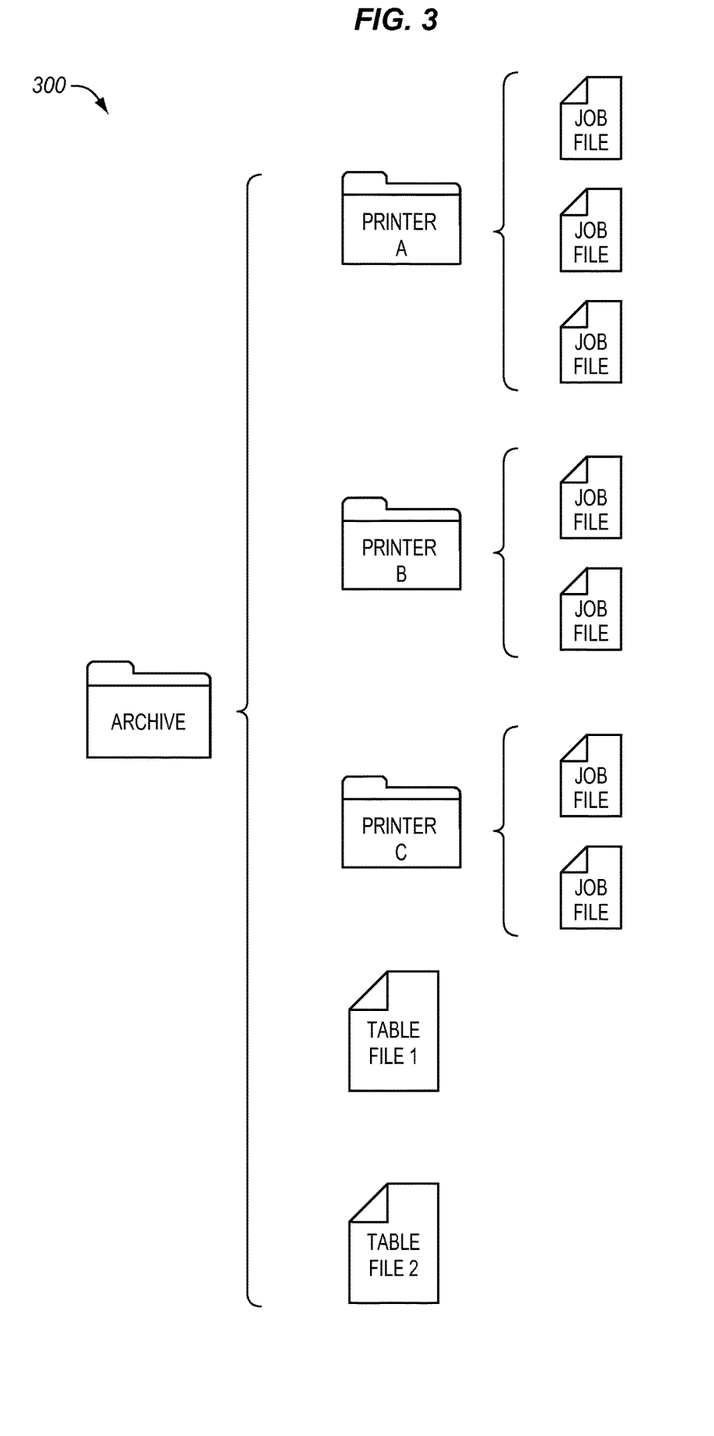
FIG. 3 is a diagram illustrating a print job archive in an exemplary embodiment.
Figure 4:
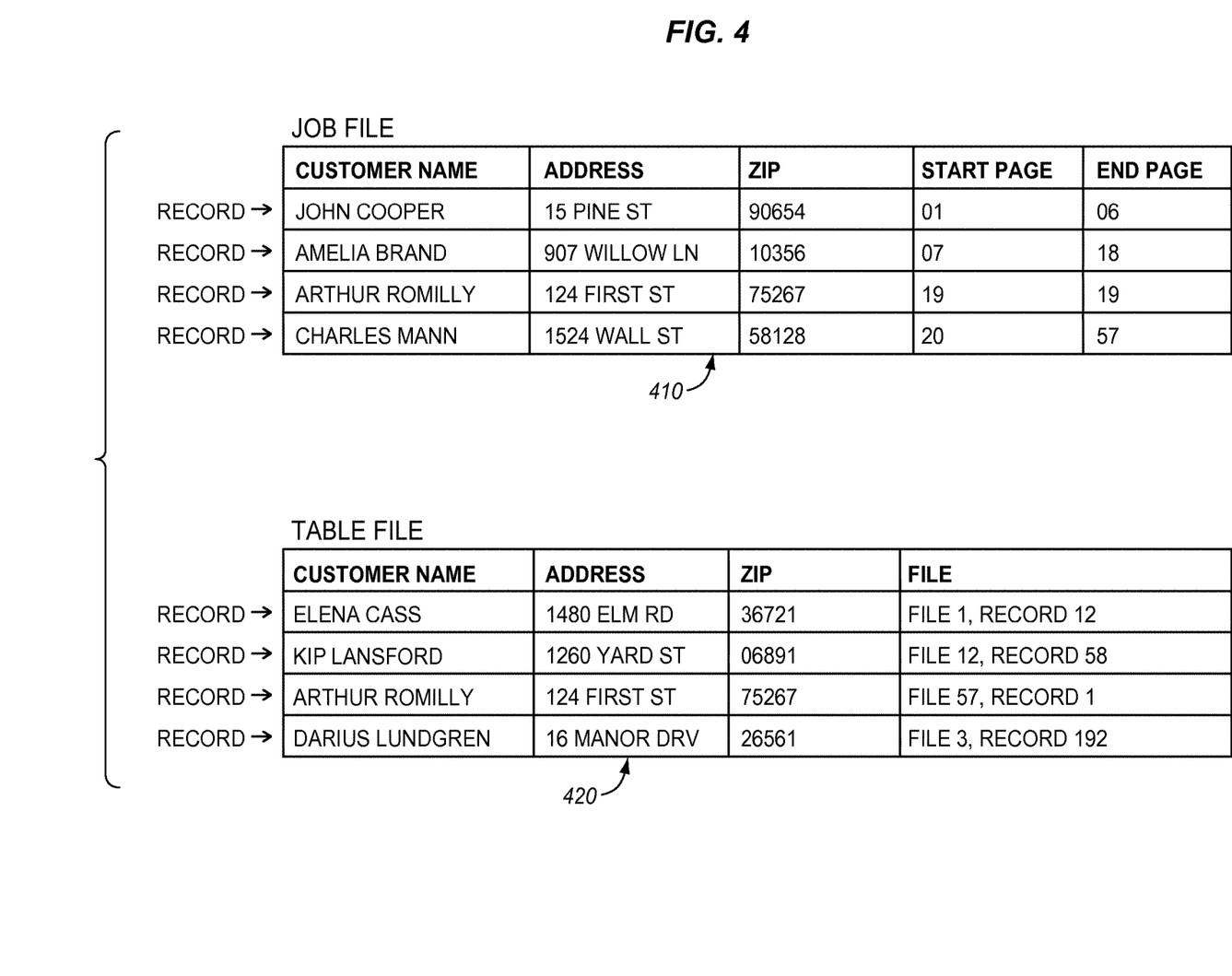
FIG. 4 is a block diagram illustrating job files and table files in an exemplary embodiment.

FIGS. 3-4 illustrate exemplary versions of print job archives. Specifically, FIG. 3 is a diagram 300 illustrating an exemplary print job archive. According to FIG. 3, the archive folder includes multiple folders (one for each printer), and multiple table files (one for each CPU core at the server). The table files are kept within the archive folder, and as new print jobs are completed, records for the print jobs are generated and distributed across the table files. In this embodiment, a print server generates a new job file each time a printer within the print shop completes a print job. The job files are each placed within the directory for their corresponding printer. An indexing controller reviews the archive directory and sub directories periodically (e.g., in response to input from the print server indicating that a job has been completed, every five minutes, etc.), identifies new job files, and updates the table files with new records based on the contents of the new job files.

FIG. 4 is a block diagram 400 illustrating a job file 410 and a table file 420 in an exemplary embodiment. In this embodiment, each job file includes records that describe the properties of all of the documents that were printed in a single print job, while each table file includes records for multiple print jobs. Thus, a table file includes records aggregated from multiple individual print jobs. In this embodiment, each record within a job file includes fields/properties such as customer name, address, ZIP, start page, and end page. Meanwhile, each table file 420 includes records with selected fields/properties from a job file. In this case, the start page and end page fields are not included in the records of table file 420, and therefore are not directly searchable. This provides a benefit by reducing the overall size of table file 420, making searching faster. Table file 420 further includes a file pointer for each record, which enables an indexing controller to rapidly acquire the originally stored job file record (including start page and end page) for any document described in table file 420.

Figure 5:
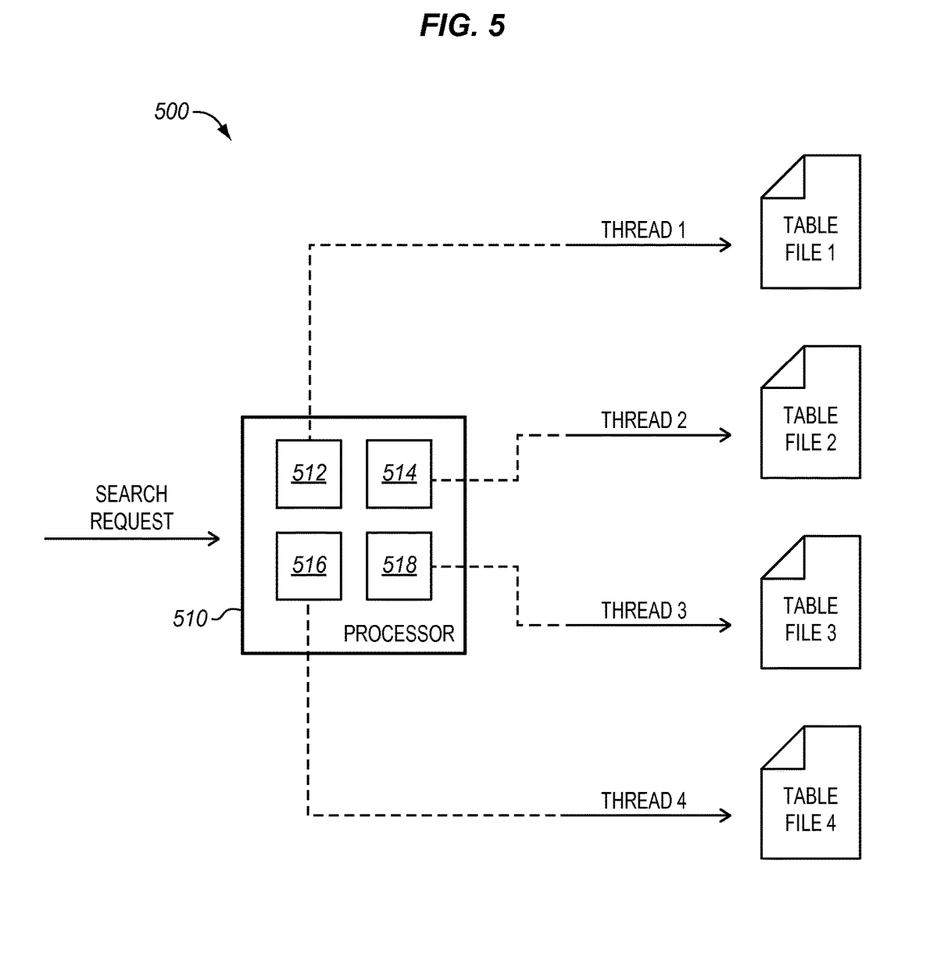
FIG. 5 is a diagram illustrating a multithreaded search performed by a processor in an exemplary embodiment.

FIG. 5 is a diagram 500 illustrating a multithreaded search performed by a processor in an exemplary embodiment. FIG. 5 is provided for illustrative purposes to show the concept that the individual CPU cores (512, 514, 516, 518) of a processor 510 each operate a separate processing thread to search a different table file maintained at a print job archive.

Further embodiments of the systems and methods described herein may utilize additional enhancements to print job archives. For example, in a further embodiment, indexing controller 112 may determine a maximum number of search results/records to return to a user. Thus, a user may indicate in their search request that the search should return no more than three results. Indexing controller 112 may then halt any ongoing search threads in response to identifying this threshold amount of records. This technique may substantially reduce the total search time in situations where the number of records to retrieve is known beforehand to the user (e.g., when the print operator is looking for one specific document, etc.).

In a further embodiment, indexing controller 112 detects a new job file with records that have new fields/properties that are not covered by the existing table files. For example, the new property/field may indicate whether a balance on a credit card statement indicated in the document is past due. Indexing controller 112 then generates a new set of table files for tracking the property (each table file corresponding to a different CPU core at server 110). The new set of table files is populated with records based on the new job file. Then, when an incoming search request is received, indexing controller 112 determines which properties/fields to search, and selects a set of table files to search based on the requested properties.

In a further embodiment where not all of the processing cores are the same speed (e.g., where there are two dual-core processors that are each a different speed), indexing controller 112 may distribute records between table files based on the speeds of their corresponding cores. For example, a table file for a faster core may be used to store a larger fraction of records than the other table files.

In yet another embodiment, indexing controller 112 may detect that a new server will be used to regularly search the archive, effectively replacing server 110. In this embodiment, indexing controller 112 may revise the number of table files in the archive based on the number of CPU cores in the new server, and then re-distribute records between the table files to ensure that the table files each include roughly the same number of records.

In a still further embodiment, the maximum size of each table file is limited to a specific size based on the amount of RAM at server 110. For example, each table file may be made small enough to ensure that it is not offloaded onto a paging file of an Operating System on server 110 when it is being processed (e.g., the table files, in aggregate, may be limited to a size smaller than the total capacity of RAM at server 110). If a table file reaches the size limit, a new set of table files (one per CPU core) may be created to store more records for the archive. Then, whenever the archive is searched, each CPU core searches one table file from the first set, and one table file from the second set. This ensures that the CPU cores do not interfere with each other during the multithreaded search.

EXAMPLES

In the following examples, additional processes, systems, and methods are described in the context of a print job archiving system that stores information describing completed print jobs.

In this embodiment, a print server at a print shop manages the operations of ten printers, and stores an archive on a hard disk describing the documents printed by each of the printers. The archive is a file folder that includes multiple sub-folders inside of it. Each sub-folder includes job files for a different printer. As print jobs are completed, the print server creates new job files and places them in the appropriate directory of the archive. The archive is searchable in its present form (e.g., via a search performed via the Operating System), but is efficiently searchable.

The print server also includes an indexing controller, which operates on a processor and memory in the print server. The indexing controller sets up and maintains searchable table files for the archive. At initialization, the indexing controller reviews a configuration file at the print server in order to determine the number of CPU cores used by a processor of the server. In this example, there are four separate CPU cores. Therefore, the indexing controller generates four separate tab-delimited table files in the archive. The files are stored in the "object property file" format. The indexing controller then generates records for the table files based on the records in the existing job files, populates the table files with the generated records, and waits for new job files to be created by the print server. Further operations of the indexing controller are described with regard to method 600 of FIG. 6.

Figure 6:
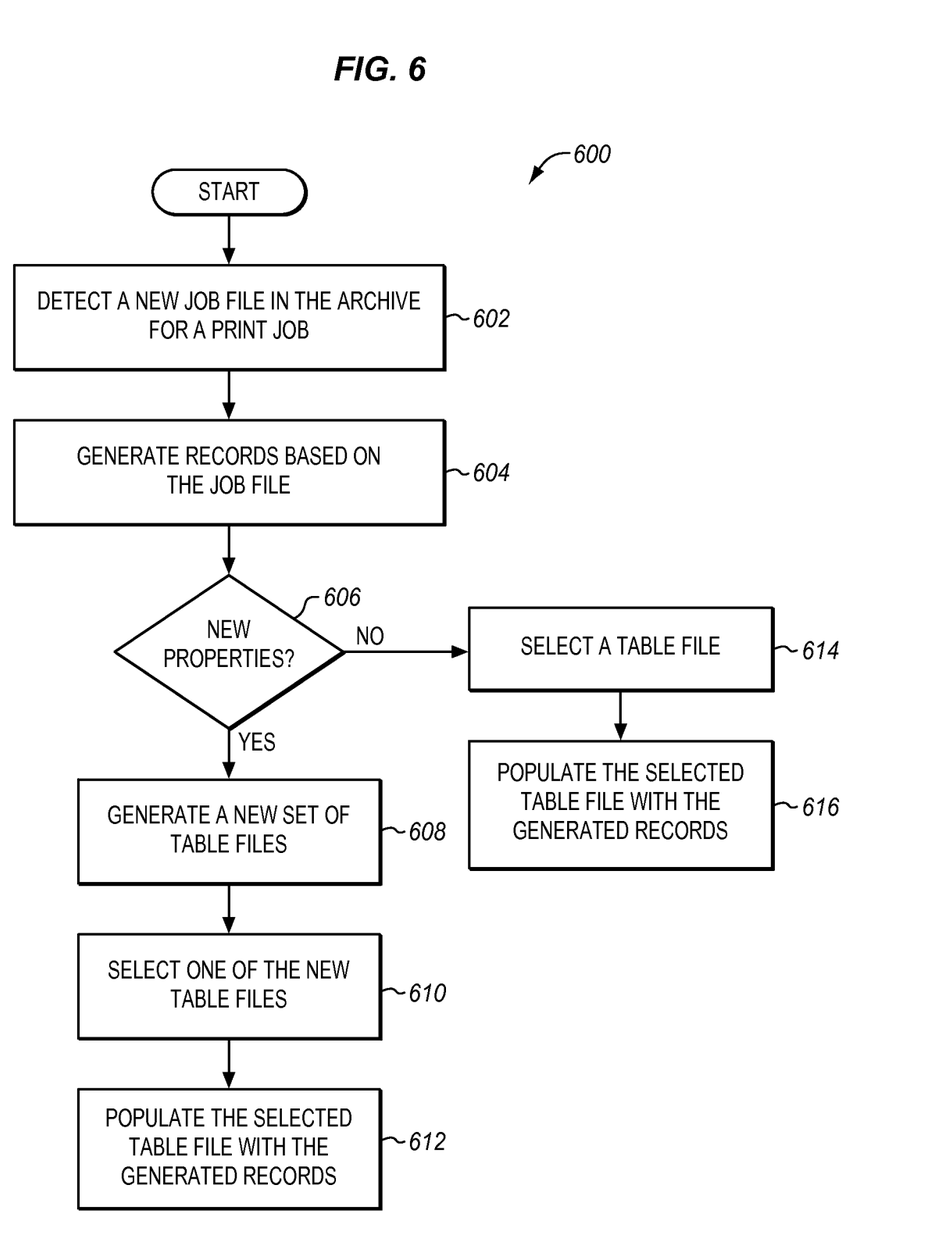
FIG. 6 is a flowchart illustrating a further method for operating a print job archiving system in an exemplary embodiment.

According to step 602 of FIG. 6, each time a new job file is created by the print server, it reports the new job file to the indexing controller. The indexing controller detects the new job file in the archive, and parses the new job file to detect individual records within the job file. In this example, each record is a series of textual or numeric fields that each describe a different aspect of the document. The fields are customer name, address, ZIP code, start page, and end page. For each record in the new job file, the indexing controller generates a new record for a table file. Each new table file record includes a subset of the fields from the original record in the job file, and also includes a pointer to the original record in the job file.

While new job files will each typically include records that define the same set of fields, some new job files will include new fields that are not currently represented by the table files (this is because different printers or customers may track different aspects of each print job). Thus, the indexing controller determines in step 606 whether the job file only includes properties/fields that are already described in the existing table files. If the job file includes properties/fields that are already indexed, then the indexing controller selects a table file in step 614 that has the smallest file size, and populates the selected table file in step 616 with new records that each include a customer name, address, ZIP code, and a pointer to the original record file on which it is based.

Alternatively, if the indexing controller in step 606 determines that the job file includes new properties/fields that are not currently described in the existing table files, then the indexing controller either appends the field/property to the existing table files, or generates a new table comprising a new set of table files in step 608. If the indexing controller generates a new table, it selects one of the new table files in step 610, and populates the selected table file with the records that were generated from the newly created job file. Then, when an incoming search request is received, the indexing controller performs a search on the table that stores information relevant to the search request. For example, if one set of table files includes a field for customer name, and another set of table files includes a field for balance due, the indexing controller may elect to search one set or the other based on the contents of the search request. Thus, even though there are multiple tables, the CPU cores of the server still process different table files from each other and do not interfere with each other. In this manner, the properties of each document in the archive are accurately tracked and maintained in a format that is efficiently searchable.

Figure 7:
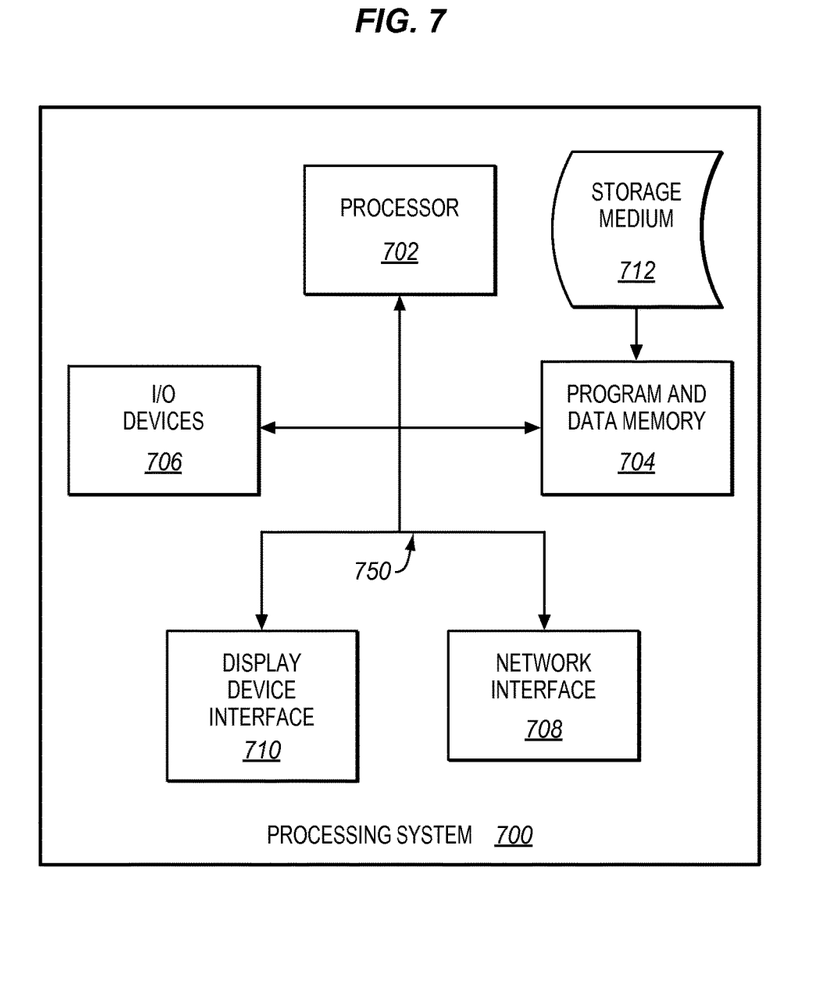
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of indexing controller 112 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We claim:

1. A system comprising:
a memory; and
an indexing controller configured to generate an archive for tracking completed print jobs by determining a number of Central Processing Unit (CPU) cores at a server that accesses the archive, and by generating a number of table files in the archive equal to the number of CPU cores,
the indexing controller is configured to populate the archive by detecting print jobs, by generating records that describe properties of the print jobs, and by distributing the records between the table files such that each table file includes a different set of records,
the indexing controller is configured to search the archive by receiving a search request by triggering multiple processing threads that each utilize a different CPU core of the server to review a different table file of the archive based on the search request, and by reporting a set of records in the archive that match the request.

2. The system of claim 1, wherein:
the search request includes a limit indicating a threshold amount of records to report, and
the indexing controller is configured to halt the processing threads in response to identifying a number of records equal to the threshold amount.

3. The system of claim 1, wherein:
the indexing controller is configured to generate each table file as a series of delimited values.

4. The system of claim 1, wherein:
the indexing controller is configured to distribute records by appending the records for a print job to the table file that currently stores the smallest amount of records.

5. The system of claim 1, wherein:
the archive is a file folder; and
the indexing controller is configured to detect a print job by detecting a newly created job file in the archive.

6. The system of claim 5, wherein:
the indexing controller is configured to determine that a newly generated job file includes a property not listed in the table files, and to generate new table files for tracking the property.

7. The system of claim 6, wherein:
the indexing controller is configured to select a set of table files to search, based on the search request.

8. The system of claim 1, wherein:
the search request is a partial search term; and
the indexing controller is configured to identify records that include the partial search term.

9. A method comprising:
generating an archive for tracking print jobs by:
determining a number of Central Processing Unit (CPU) cores at a server that accesses the archive; and
generating a number of table files in the archive equal to the number of CPU cores,
populating the archive by:
detecting print jobs;
generating records that describe properties of the print jobs; and
distributing the records between the table files such that each table file includes a different set of records; and
searching the archive by:
receiving a search request;
triggering multiple processing threads that each utilize a different CPU core of the server to review a different table file of the archive based on the search request; and
reporting a set of records in the archive that match the request.

10. The method of claim 9, wherein:
the search request includes a limit indicating a threshold amount of records to report; and
the method further comprises halting the processing threads in response to identifying a number of records equal to the threshold amount.

11. The method of claim 9, further comprising:
generating each of the table files as a series of delimited values.

12. The method of claim 9, wherein:
distributing records comprises appending the records for a print job to the table file that currently stores the smallest amount of records.

13. The method of claim 9, wherein:
the archive is a file folder, and
detecting a print job comprises detecting a newly created job file in the archive.

14. The method of claim 13, further comprising:
determining that a newly generated job file includes a property not listed in the table files; and
generating new table files for tracking the property.

15. The method of claim 14, further comprising:
selecting a set of table files to search, based on the search request.

16. The method of claim 9, wherein:
the search request is a partial search term; and
the method further comprises identifying records that include the partial search term.

17. A non-transitory computer readable medium embodying programmed instructions which, when executed by a processor, are operable for performing a method comprising:
generating an archive for tracking print jobs by:
determining a number of Central Processing Unit (CPU) cores at a server that accesses the archive; and generating a number of table files in the archive equal to the number of CPU cores, populating the archive by:
  detecting print jobs;
  generating records that describe properties of the print jobs; and
  distributing the records between the table files such that each table file includes a different set of records; and searching the archive by:
  receiving a search request;
  triggering multiple processing threads that each utilize a different CPU core of the server to review a different table file of the archive based on the search request; and
  reporting a set of records in the archive that match the request.

18. The medium of claim 17, wherein: the search request includes a limit indicating a threshold amount of records to report; and the method further comprises halting the processing threads in response to identifying a number of records equal to the threshold amount.

19. The medium of claim 18, wherein the method further comprises:
  generating each of the table files as a series of delimited values.

20. The medium of claim 18, wherein:
  distributing records comprises appending the records for a print job to the table file that currently stores the smallest amount of records.

\* \* \* \* \*